(12) United States Patent
Luebben et al.

(10) Patent No.: US 9,040,635 B1
(45) Date of Patent: May 26, 2015

(54) RENEWABLE POLYMER AND METHOD OF MAKING

(71) Applicant: TDA Research, Inc., Wheat Ridge, CO (US)

(72) Inventors: Silvia DeVito Luebben, Golden, CO (US); James William Raebiger, Golden, CO (US); Aaron Jeremy Skaggs, Denver, CO (US)

(73) Assignee: TDA Research, Inc., Wheat Ridge, CO (US)

( * ) Notice: Subject to any disclaimer, the term of this patent is extended or adjusted under 35 U.S.C. 154(b) by 76 days.

(21) Appl. No.: 14/158,612

(22) Filed: Jan. 17, 2014

Related U.S. Application Data

(60) Provisional application No. 61/753,598, filed on Jan. 17, 2013.

(51) Int. Cl.
| | |
|---|---|
| *C08G 63/91* | (2006.01) |
| *C08G 65/48* | (2006.01) |
| *C08G 65/34* | (2006.01) |
| *C08G 65/32* | (2006.01) |

(52) U.S. Cl.
CPC ............... *C08G 65/48* (2013.01); *C08G 65/34* (2013.01)

(58) Field of Classification Search
USPC .................................. 528/196, 198; 525/410
See application file for complete search history.

(56) References Cited

U.S. PATENT DOCUMENTS

| | | |
|---|---|---|
| 5,252,188 A | 10/1993 | Stradal et al. |
| 7,094,932 B2 | 8/2006 | Majerski et al. |

OTHER PUBLICATIONS

Investigation of the mechanism of the Dissociation of Glycolaldehyde Dimer (2,5-dihydroxy-1,4,-dioxane) by FTIR spectroscopy Varoujan A. Yaylayan et al. McGill University, Department of Food Science and Agricultural Chemistry, 21, 111 Lakeshore, Ste. Anne de Bellevue, Quebec, H9X3V9, Canada: Received Mar. 25, 1998.*
Anthony V. Bridgwater, biomass fast pyrolysis, Thermal Science: vol. 8 (2004), No. 2, pp. 21-49.
Peter J. O'Brien at al., Aldehyde Sources, Metabolism, Molecular Toxicity Mechanisms, and Possible Effects on Human Health, Critical Reviews in Toxicology, 35:609-662, 2005.
Yoko Kobayashi and Hiroaki Takahashi, Conformational studies of glycolaldehyde and 1,3 dihydroxyacetone in solution by IH-NMR, Spectrochimlca Acta. vol. 35A. pp. 3O7 to 314.
Varoujan A. Yaylayan at al., Investigation of the mechanism of dissoc. of glycolaldehyde dimer (2,5-dihydroxy-1,4-dioxane) by FTIR . . . , Carbohydrate Research 309 (1998) 31-38.

* cited by examiner

*Primary Examiner* — Terressa Boykin
(74) *Attorney, Agent, or Firm* — Brian J. Elliott

(57) ABSTRACT

A polymer, optionally made from renewable sources, comprising a specific chemical structure that is a result of the polymerization of α-hydroxycarbonyl compounds (alpha-hydroxycarbonyl compounds), particularly α-hydroxyaldehydes (alpha-hydroxyaldehydes) and α-hydroxyketones (alpha-hydroxyketones), or glycolaldehyde. A method of polymerization, the method comprising the step of reacting trimethylsilyl trifluoromethanesulfonate with the cyclic dimer of one or more α-hydroxycarbonyl compounds. A method of making said polymer, the method comprising dehydrating a cyclic dimer of one or more α-hydroxycarbonyl compounds. An end-capped polymer made from one or more α-hydroxycarbonyl compounds and terminal end-cap groups.

20 Claims, 1 Drawing Sheet

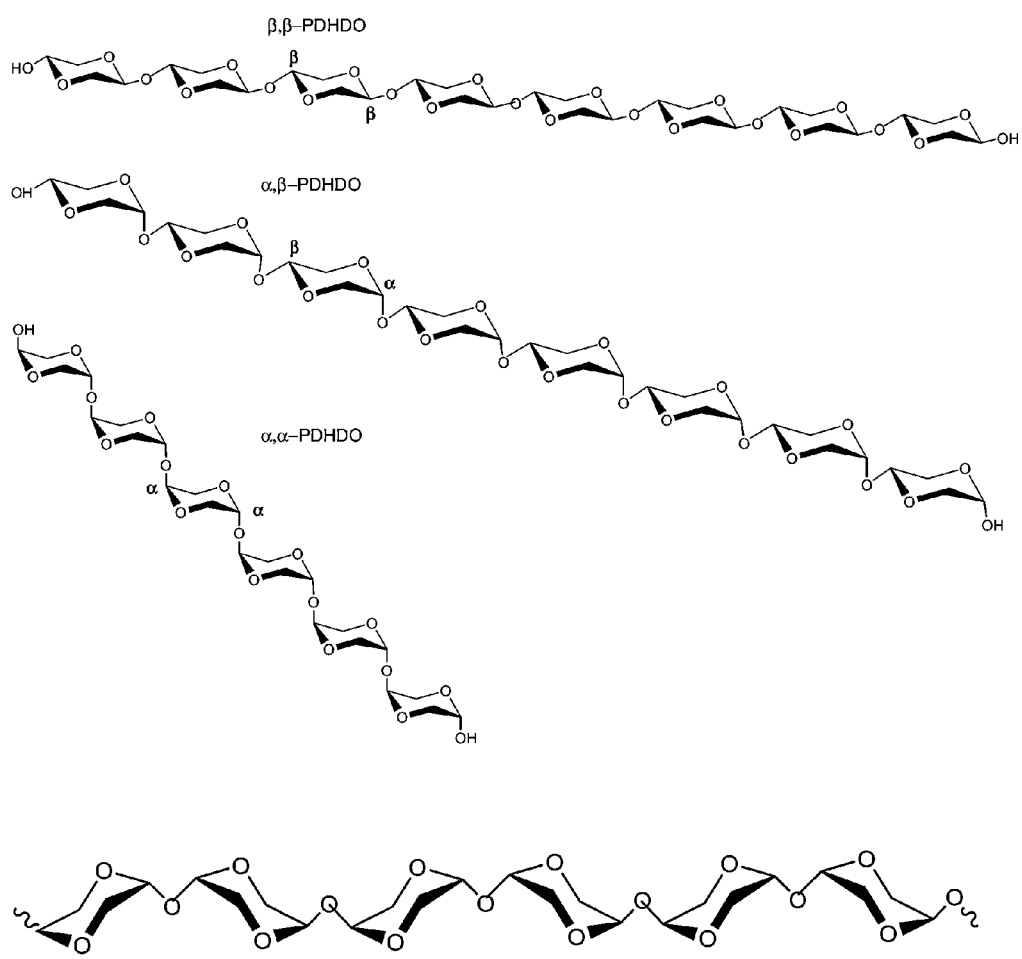

RENEWABLE POLYMER AND METHOD OF MAKING

CROSS-REFERENCE TO RELATED APPLICATIONS

The present application claims the benefit of the provisional application No. 61/753,598, filed Jan. 17, 2013 (titled A NEW RENEWABLE POLYMER FROM BIO-OIL, by Silvia Luebben and Aaron Skaggs), which is incorporated by reference herein. Provisional application No. 61/753,598 is not admitted to be prior art with respect to the present invention by its mention in the background or cross-reference section.

STATEMENT REGARDING U.S. GOVERNMENT SUPPORT

This invention was made using U.S. government funding through the U.S. Environmental Protection Agency contract No. EP-D-11-057 and U.S. Department of Agriculture contract No. 2013-33610-20834. The government has certain rights in this invention.

BACKGROUND OF THE INVENTION

This invention relates to the composition of matter of a polymer made from α-hydroxycarbonyl compounds (alpha-hydroxycarbonyl compounds), particularly α-hydroxyaldehydes (alpha-hydroxyaldehydes) and α-hydroxyketones (alpha-hydroxyketones) and more particularly from glycolaldehyde; optionally, the α-hydroxycarbonyl compounds are derived from renewable sources. This invention also relates to the methods for making the polymer.

As the plastics industry moves more toward bio-based products and raw materials, there is a need for high-performance renewable polymers. There is a lack of high performance polymers that can be made from bio-based, renewable sources.

A few examples of the very numerous manufactured items that substantially use petroleum-based polymers include water bottles, food packaging, durable goods such as wireless devices and agricultural films. Other examples of manufactured items that are made mostly from petroleum-based polymers include plastic utensils, cutlery and tableware, and these applications require a higher modulus (more rigid) thermoplastic polymer. A renewable polymer material would be useful for these and other manufactured items.

Current renewable polymers can be categorized into three classes. The first class includes nature-made polymers such as starch, cellulose, lignin, chitin, etc. that are transformed and processed into plastics and composites. Materials made from these sources have good degradation profiles and are often cost-competitive for disposable packaging applications, but their mechanical properties and processing characteristics are significantly inferior to engineered thermoplastics made from petrochemicals. The second class includes hybrid materials made by reaction of a renewable component with a petrochemical component; for example polyurethane coatings or foams can be made by reacting soy or castor oil polyols with a petrochemical di-isocyanate. This second class of material is only partially "renewable" and most products are thermosets rather than thermoplastics. The third class of renewable polymers is that of synthetic polymers made from renewable building blocks. This third class of renewable polymers offers, in principle, high versatility for making a variety of materials with different properties and performances. However, the choice for available renewable building blocks is extremely limited when compared to petrochemical monomers. Current renewable monomers include ethylene (from bioethanol) for making poly(ethylene), vegetable based polyols, diacids (such as succinic acid) and various hydroxy acids (or their cyclic lactones) such as lactic acid, glycolic acid, hydroxybutyric acid, and hydroxyvaleric acid for making polyesters. Therefore, current synthetic renewable thermoplastics are effectively limited to polyethylene and polyesters.

In another technology area, fast pyrolysis is one of the thermal processes that are being developed to make biofuels and bio-chemicals from biomass: it produces a liquid that can be used both as fuel and a source of chemicals. Fast pyrolysis is used on a small scale for producing glycolaldehyde and other hydroxyaldehydes for food applications and bio-lime as a sulfur oxide sorbent (Bridgewater 2004). Bridgewater (2004) teaches the above fast pyrolysis processes, and is incorporated by reference herein. One of the light components is 2-hydroxyacetaldehyde (also called "glycolaldehyde"). Depending upon the pyrolysis conditions and the feedstock, glycolaldehyde can constitute up to 17 wt %. of the bio-oil, and this fraction can be increased to 33% with the addition of sodium chloride (Bridgewater 1996). Glycolaldehyde spontaneously dimerizes to form the cyclic compound 2,5-dihydroxy-1,4-dioxane (DHDO). DHDO crystallizes to a white solid and therefore can be isolated in a highly pure form even when produced from a mixed feedstock and in the presence of other byproducts. Scheme 1 shows the spontaneous dimerization of glycolaldehyde in solution to form the crystalline cyclic compound 2,5-dihydroxy-1,4-dioxane (DHDO); the asterisks show the position of the chiral centers.

Scheme 1

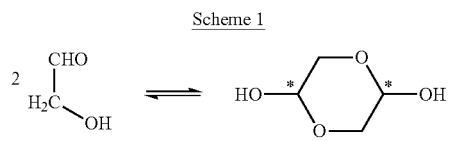

Kobayashi (1979) and Yaylayan (1998) teach that when glycoaldehyde is dissolved in water or solvents the 1,4-dioxane ring structure can reversibly open and close with the formation of up to nine different molecular species. Kobayashi, 1979 and Yaylayan, 1998 are incorporated by reference herein.

Glycolaldehyde is a two-carbon molecule, is non-toxic and is a natural metabolite resulting from the metabolism of sorbitol (a common low-calorie sweetener) and from the oxidative degradation of ascorbate and xylitol (O'Brien 2005). Glycolaldehyde is used in the food industry as a browning agent for baked goods, it is contained in soy sauce, and is formed naturally during sugar caramelizing.

Pyrolysis is the thermal decomposition in absence of oxygen. Fast pyrolysis is carried out by exposing finely subdivided (less than 3 mm in size) solid biomass (especially lignocellulosic feedstock) to high temperatures (400-500° C.) for a short period of time (for example, 2 seconds) in an inert atmosphere or under vacuum. This process produces a mixture of volatile gases, liquid vapors and aerosols. The mixture of products is then rapidly condensed to produce a brown dense liquid (bio-oil) which is about 50%-75% of the original mass and typically contains 15-35% water and a variety of oxygenated organic compounds including acids, phenols, and hydroxyaldehydes. Among the organic compounds glycolaldehyde is the most abundant component, 10-17% of the total depending upon the feedstock (Stradal 1993, Bridgewater 2005). A higher yield of glycolaldehyde can be obtained when using a feedstock that contains a high amount of cellulose or hemicellulose and less lignin. Glycoaldehyde is an example of a larger set of compounds known as α-hydroxycarbonyl compounds.

U.S. Pat. No. 5,252,188 (Stradal and Underwood, 1993) teaches a process to isolate or purify glycolaldehyde (2-hydroxyacetaldehyde) from pyrolysis-derived bio-oil. U.S. Pat. No. 5,252,188 is incorporated by reference herein. Majerski (2001) teaches a method for isolation of glycolaldehyde based on the crystallization of its dimeric form (U.S. Pat. No. 7,094,932).

There remains a need in the art for polymers that can be obtained from bio-derived feedstocks. This invention teaches the composition and methods of preparation of novel renewable thermoplastic polymers made from hydroxyaldehydes, which may optionally be derived from the fast pyrolysis of biomass, specifically cellulosic feedstock. Thermosets are polymers that form irreversible bonds during cure, while thermoplastics are polymers that become pliable or moldable above a specific temperature and return to a solid state upon cooling. There is a particular need in the art for renewable thermoplastics.

BRIEF SUMMARY OF THE INVENTION

The invention solves the shortcomings of the prior art and provides a useful renewable thermoplastic needed in the art. This invention relates to a new polymer, which is optionally made from renewable sources, and is made by polymerization of α-hydroxycarbonyl compounds (alpha-hydroxycarbonyl compounds), particularly α-hydroxyaldehydes (alpha-hydroxyaldehydes) and α-hydroxyketones (alpha-hydroxyketones).

One embodiment of this invention teaches a polymer made from glycolaldehyde. Glycolaldehyde (2-hydroxyacetaldehyde, Scheme 2 left), is the smallest carbohydrate with only two carbon atoms in the molecule. Glycolaldehyde spontaneously dimerizes to for the cyclic molecule (2,5-dihydroxy-1,4-dioxane, DHDO Scheme 2 center), which is crystalline compound that can be easily purified. This invention teaches the composition and method of preparation of the polymer resulting from the condensation of the glycolaldehyde dimer DHDO into the polymer poly(2,5-dihydroxy-1,4-dioxane) or PDHDO (Scheme 2, right).

Scheme 2.

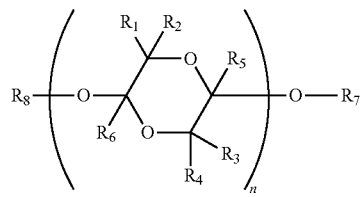

Glycolaldehyde dimer (2,5-dihydroxy-1,4-dioxane) is a renewable monomer because it can be obtained in large quantities and high purity as a by-product of the fast pyrolysis of biomass, such as forest biomass.

Another embodiment of this invention teaches the composition and method of preparation of a polymer made from one or more α-hydroxycarbonyl compounds. Yet another embodiment of this invention teaches an end-capped polymer made from one or more α-hydroxycarbonyl compounds.

BRIEF DESCRIPTION OF THE DRAWINGS

FIG. 1. Structure of possible tactic forms of poly(2,5-dihydroxy-1,4-dioxane), or PDHDO.

DETAILED DESCRIPTION OF THE INVENTION

This invention provides the composition of matter of a polymer and its preparation. In one embodiment, the polymer comprises the following chemical structure:

$$R_8 \text{---} \left( O \underset{\underset{R_4}{R_6}}{\overset{\overset{R_1}{R_2}}{\underset{O}{\bigcirc}}} \underset{R_3}{\overset{R_5}{\bigcirc}} \right)_n O \text{---} R_7$$

wherein: "n" is an integer number selected from 4 to 10,000,000 and $R_1$, $R_2$, $R_3$, $R_4$, $R_5$, $R_6$, $R_7$ and $R_8$, are independently from each other selected from hydrogen (—H), deuterium (-D), an halogen atom (—F, —Cl, —Br, —I), a hydroxyl group (—OH), an amino group (—NH$_2$), an alkylamino group (—NHR$_9$), a (bisalkylamino) group [—N(R$_9$)$_2$], an alkyl group, an alkenyl group, an alkynyl group, an alkoxy group, an alkoxyalkyl group, an alkoxyalkenyl group, an alkoxyalkynyl group, an haloalkyl group, an haloalkenyl group, an haloalkynyl group, an haloalkoxy group, an aryl group, an alkoxyaryl group, an haloaryl group, an alkylaryl group, an acyl group, an alkyl carbonate group, a thiol group (—SH), alkylthio (—SR$_9$), a nitro group (—NO$_2$), a cyano group (—C≡N), a isocyanate group (—N═C═O), a azide group (—N$_3$), a cyanate group (—O═C═N), a nitroso group (—NO), a phosphine group [—P(R$_9$)$_2$], a phosphate group [—OP(O)(OR$_9$)$_2$], a phosphonate group [—P(O)(OR$_9$)$_2$], a sulfate group (—O—SO$_3$R$_9$), a sulfonate group (—SO$_3$R$_9$), a thiocyanate group (—S═C═N), a iso thiocyanate group (—N═C═S), a —COR$_9$ group, a —COOR$_9$ group, a —CON(R$_9$)$_2$ group, a —CSR$_9$ group, a —CS—OR$_9$ group, a —N(R$_9$)$_2$ group, a —CO—O—CO—R$_9$, a —CO—NR$_9$—CO—R$_9$, a —N═C(R$_9$)$_2$, or a —CR$_9$═NR$_9$; and can optionally be substituted by substitution of one or more hydrogen atom with deuterium (-D), an halogen atom (—F, —Cl, —Br, —I), a hydroxyl group (—OH), an amino group (—NH$_2$), an alkylamino group (—NHR$_9$), a (bisalkylamino) group [—N(R$_9$)$_2$], an alkyl group, an alkenyl group, an alkynyl group, an alkoxy group, an alkoxyalkyl group, an alkoxyalkenyl group, an alkoxyalkynyl group, an haloalkyl group, an haloalkenyl group, an haloalkynyl group, an haloalkoxy group, an aryl group, an alkoxyaryl group, an haloaryl group, an alkylaryl group, an acyl group, an alkyl carbonate group, a thiol group (—SH), alkylthio (—SR$_9$), a nitro group (—NO$_2$), a cyano group (—C≡N), a isocyanate group (—N═C═O), a azide group (—N$_3$), a cyanate group (—O═C═N), a nitroso group (—NO), a phosphine group [—P(R$_9$)$_2$], a phosphate group [—OP(O)(OR$_9$)$_2$], a phosphonate group [—P(O)(OR$_9$)$_2$], a sulfate group (—O—SO$_3$R$_9$), a sulfonate group (—SO$_3$R$_9$), a thiocyanate group (—S═C═N), a iso thiocyanate group (—N═C═S), a —COR$_9$ group, a —COOR$_9$ group, a —CON(R$_9$)$_2$ group, a —CSR$_9$ group, a —CS—OR$_9$ group, a —N(R$_9$)$_2$ group, a —CO—O—CO—R$_9$, a —CO—NR$_9$—

CO—R₉, a —N=C(R₉)₂, a —CR₉=NR₉; where each R₉ is independently, a hydrogen, an alkyl, an aryl, an alkenyl or an alkynyl group, and each of which R₉ may be optionally substituted with one or more halogen, hydroxy group, nitro group, cyano group, isocyano group, oxo group, thioxo group, azide group, cyanate group, isocyanate group, nitroso group, phosphine group, phosphate group, thiocyano group, or thiocyanate group. Additionally $R_1$, $R_2$, $R_3$, $R_4$, $R_5$, $R_6$, $R_7$ and $R_8$, may be oligomeric, pre-polymeric or polymeric in nature and selected from the group consisting of end-capped or uncapped polyethers, poly(fluoroethers), polyglycols, polyacetals, polyolefins, polystyrene, polyfluoroolefins, polyoxides, polychlorolefins, polychlorofluoroolefins, polysiloxanes, polyesters, polybromoesters, natural and synthetic rubbers, polyols, polyalcohols, polyacids, polycarbonates, polyanhydrides, polysulfides, polyamides, polyamines, polyimides, vinyl polymers, polymers derived from the polymerization of unsaturated monomers, polyacrylates, polymethacrylates, polyacrylonitriles, polybutadiene, alkyds, polyurethanes, epoxies, cellulose and its derivatives, starch and its derivatives, polypeptides, and copolymers thereof.

In a preferred embodiment $R_1$, $R_2$, $R_3$, $R_4$, $R_5$ are $R_6$ are independently selected from hydrogen or a linear or branched alkyl group, particularly $C_1$-$C_{20}$ alkyl groups.

In another preferred embodiment $R_7$, and $R_8$ are independently selected from hydrogen or a linear or branched alkyl group, particularly $C_1$-$C_{20}$ alkyl groups, or an acyl group (—C=OR₉).

In a more preferred embodiment $R_1$, $R_2$, $R_3$, $R_4$, $R_5$ and $R_6$, are hydrogen; and $R_7$, and $R_8$ are independently selected from hydrogen, a linear or branched $C_1$-$C_{20}$ alkyl group, or an acyl group (—(C=O)R₉), and the polymer has the chemical structure:

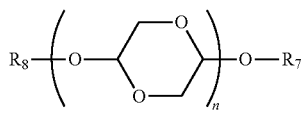

A preferred polymer is obtained by polymerization of glycolaldehyde dimer, also called 2,5-dihydroxy-1,4-dioxane (DHDO) as shown in Scheme 2. The polymer is named poly(2,5-dihydroxy-1,4-dioxane) or PDHDO.

In another more preferred embodiment $R_1$, and $R_3$ are selected from a linear or branched $C_1$-$C_{29}$ alkyl group; $R_2$, $R_4$, $R_5$ and $R_6$ are hydrogen; and $R_7$, and $R_8$ are independently selected from hydrogen, a linear or branched $C_1$-$C_{20}$ alkyl group, or an acyl group (—C=OR₉), and the polymer has the chemical structure:

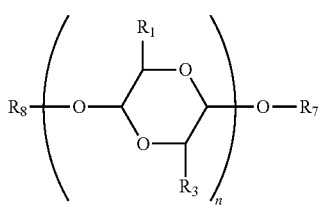

A preferred polymer is obtained by polymerization of lactaldehyde dimer as shown in Scheme 3.

Scheme 3

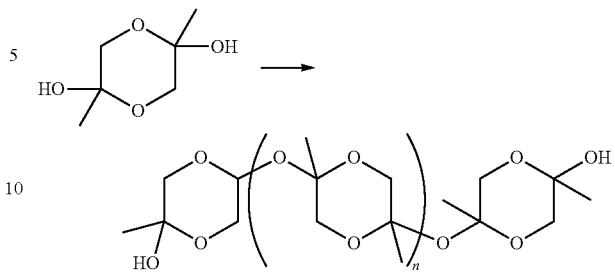

In another more preferred embodiment $R_1$, and $R_3$ are selected from an aryl group, preferably a phenyl group, an alkylphenyl, or an alkoxyphenyl group; $R_2$, $R_4$, $R_5$ and $R_6$ are hydrogen; and $R_7$, and $R_8$ are independently selected from hydrogen, a linear or branched $C_1$-$C_{20}$ alkyl group, or an acyl group (—C=OR₉).

A preferred polymer is obtained by polymerization of mandelaldehyde as shown in Scheme 4.

Scheme 4

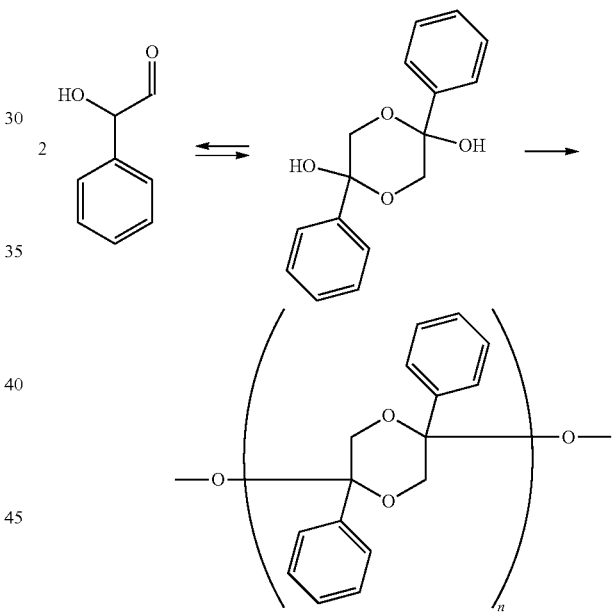

In one embodiment $R_1$ and $R_3$ are identical groups, $R_2$ and $R_4$ are identical groups, $R_5$ and $R_6$ are identical groups. In another embodiment $R_7$ and $R_8$ are identical groups.

In a preferred embodiment "n" is an integer number from 15 to 100,000, and most preferably from 200 to 10,000. In another preferred embodiment n is at least 20 and in a more preferred embodiment "n" is at least 23, even more preferably at least 240 and even more preferably at least 700.

The polymer disclosed in this invention is prepared by polymerization of one or more monomers selected from α-hydroxycarbonyl compounds (alpha-hydroxycarbonyl compounds), particularly α-hydroxyaldehydes (alpha-hydroxyaldehydes) or α-hydroxyketones (alpha-hydroxyketones); optionally, the α-hydroxycarbonyl compounds are derived from renewable sources.

In one embodiment the α-hydroxycarbonyl monomer is in thermodynamic equilibrium with a 6 member-ring cyclic dimer with a 1,4-dioxane ring skeleton as shown in Scheme 5.

Scheme 5

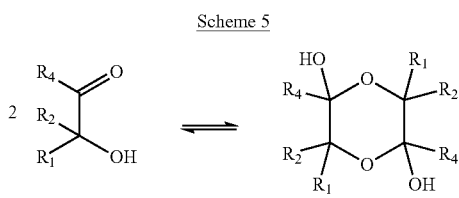

In a more preferred embodiment the monomer in bulk form exits at 20° C. more than 20% by weight in its 6 member-ring cyclic dimeric form, and more preferably more than 50% by weight, and most preferably more than 70% by weight. In a preferred embodiment the dimeric form of the monomer is a solid crystalline compound.

Glycolaldehyde (2-hydroxyacetaldehyde) and lactaldehyde (2-hydropropanal) are examples of preferred α-hydroxycarbonyl monomers that preferentially exist in dimeric form at room temperature when in the solid state. 2,5-Dihydroxy-1,4-dioxane (DHDO, the dimer of glycolaldehyde) and 3,6-dimethyl-2,5-dihydroxy-1,4-dioxane (the dimer of lactaldehyde) are highly crystalline compounds that can be easily purified and are especially useful monomers in this invention. 2,3,5,6-Tetramethyl-1,4-dioxane-2,5-diol, the dimer of 3-hydroxybutan-2-one is also a useful monomer in this invention. The dimer of hydroxy-2-phenyl acetaldehyde, (also called mandelaldehyde) is another monomer useful in this invention.

In one embodiment polymerization of the α-hydroxycarbonyl monomer is carried by direct dehydration of the dimeric monomer (Scheme 6).

Scheme 6

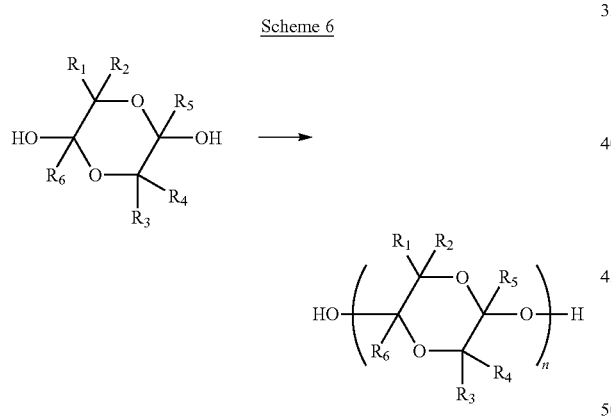

The dehydration reaction can be carried out by refluxing the monomer a solvent and removing the water with a Dean-Stark apparatus, with molecular sieves, zeolites, phosphorous pentoxide or other dehydration reagents. Reagents and methods to remove water from organic chemistry reactions are known to those skilled in the art. Dynamic vacuum may also be used to remove water from the reaction, while running the reaction at or below room temperature. The dehydration reaction can also be carried out in the presence of one or more homogeneous or heterogeneous catalysts. Useful catalysis may include inorganic and organic acids, superacids, zeolites, activated alumina, cross-linked acid resins, Lewis acids and coordinating reagents. Preferred catalysts include para-toluenesulfonic acid, sulfamic acid, the resin AMBERLITE™ PWA15, zeolites, metal triflates, metal salts of bis(trifluoromethanesulfonimide). Most preferred catalysts include $Sc(OTf)_3$, $La(OTf)_3$, $Yb(OTf)_3$, $Zn(OTf)_2$, and $Sc(NTf_2)_3$ where OTf is an abbreviation for triflate, i.e. the group $CF_3SO_3—$. The most preferred catalyst is scandium triflate. The polymerization can be carried out neat, in a solvent, or a solvent mixture. Preferred solvents include toluene, 1,4-dioxane, tetrahydrofuran, dimethylsulfoxide, dimethylformamide, dimethylacetamide, acetonitrile, butyronitrile, isoamylnitrile, and ionic liquids. Most preferred solvents are acetonitrile, butyronitrile, isoamylnitrile, and ionic liquids. Ionic liquids are ionic, salt-like, compounds which are liquid at to or slightly above room temperature. Preferred ionic liquids include imidazolium, pyridinium, pyrrolidinium, phosphonium, ammonium, and sufonium salts. More preferred ionic liquid are imidazolium salts of triflate and bis (trifluoromethylsulfonyl)imide.

In a preferred embodiment a catalyst is used in combination with one or more water-removal methods such as a Dean-Stark apparatus, the use of molecular sieves, or the use of dynamic vacuum.

In another embodiment the polymerization is carried out by converting half of the hydroxyl groups of the monomer into a better leaving group. These activated hydroxyl group can then react with the unmodified half of the hydroxyl group to carry out the polymerization. This approach is similar to the donor/acceptor reactions that are used in glycosylation chemistry. Example of activating groups include iodo and Schmidt donors (bis(trichloroacetimidate) donor) and triflates. Trimethylsilytrifluoromethanesulfonate (TMSOTf) is a particularly useful activating agent.

In yet another embodiment the polymer is made in a two-step process by first carrying out a dehydration reaction using a catalyst and then coupling the pre-polymer chains with an activating agent to increase the molecular weight of the product.

The polymer obtained is then optionally end-capped by reaction with an end-capping reagent as shown in Scheme 7.

Scheme 7

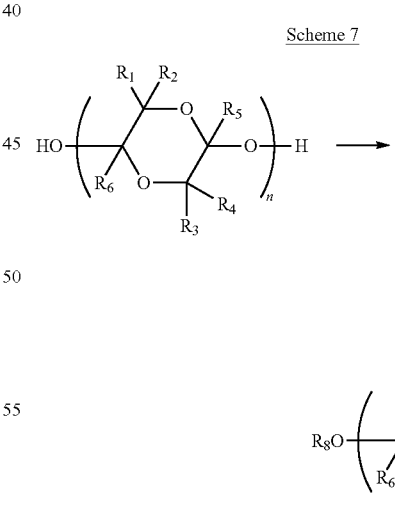

Reagents that react with a hydroxyl group can be used as end capping reagents. Anhydrides, acyl chlorides, triflates, isocyanates, alkyl iodides, activated ethers and thioethers, chlorosilanes, and chloro carbonates are examples of useful end capping reagents. Acetic anhydride is an example of useful capping agent as shown in Scheme 8.

Scheme 8

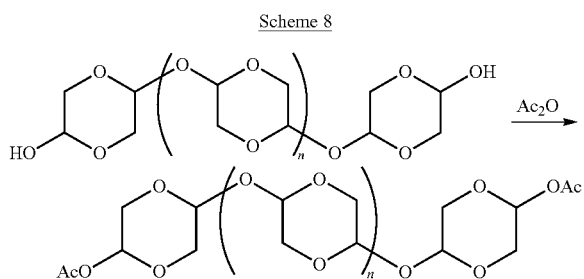

In one embodiment the polymer is made by polymerizing a mixture of two or more different monomers, and optionally the product is end-capped with an end-capping reagent to give copolymer of chemical structure:

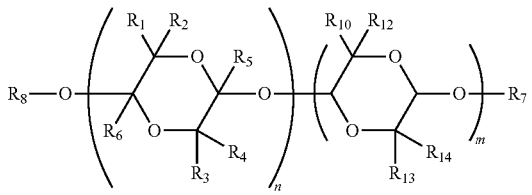

wherein: "n" is an integer number selected from 4 to 10,000,000, and "m" is a integer number selected from zero to 10,000,000; and $R_1$, $R_2$, $R_3$, $R_4$, $R_5$, $R_6$, $R_7$, $R_8$, $R_{10}$, $R_{12}$, $R_{13}$, and $R_{14}$ are independently from each other selected from hydrogen (—H), deuterium (-D), an halogen atom (—F, —Cl, —Br, —I), a hydroxyl group (—OH), an amino group (—$NH_2$), an alkylamino group (—$NHR_9$), a (bisalkylamino) group [—$N(R_9)_2$], an alkyl group, an alkenyl group, an alkynyl group, an alkoxy group, an alkoxyalkyl group, an alkoxyalkenyl group, an alkoxyalkynyl group, an haloalkyl group, an haloalkenyl group, an haloalkynyl group, an haloalkoxy group, an aryl group, an alkoxyaryl group, an haloaryl group, an alkylaryl group, an acyl group, an alkyl carbonate group, a thiol group (—SH), an alkylthio group (—$SR_9$), a nitro group (—$NO_2$), a cyano group (—C≡N), a isocyanate group (—N═C═O), a azide group (—$N_3$), a cyanate group (—O—C≡N), a nitroso group (—NO), a phosphine group [—$P(R_9)_2$], a phosphate group [—$OP(O)(OR_9)_2$], a phosphonate group [—$P(O)(OR_9)_2$], a sulfate group (—O—$SO_3R_9$), a sulfonate group (—$SO_3R_9$), a thiocyanate group (—S—C≡N), a isothiocyanate group (—N═C═S), a —$COR_9$ group, a —$COOR_9$ group, a —$CON(R_9)_2$ group, a —$CSR_9$ group, a —CS—$OR_9$ group, a —$N(R_9)_2$ group, —CO—O—CO—$R_9$, a —CO—$NR_9$—CO—$R_9$, a —N═C($R_9)_2$, or a —$CR_9$═$NR_9$; and can optionally be substituted by substitution of one or more hydrogen atom with deuterium (-D), an halogen atom (—F, —Cl, —Br, —I), a hydroxyl group (—OH), an amino group (—$NH_2$), an alkylamino group (—$NHR_9$), a (bisalkylamino) group [—$N(R_9)_2$], an alkyl group, an alkenyl group, an alkynyl group, an alkoxy group, an alkoxyalkyl group, an alkoxyalkenyl group, an alkoxyalkynyl group, an haloalkyl group, an haloalkenyl group, an haloalkynyl group, an haloalkoxy group, an aryl group, an alkoxyaryl group, an haloaryl group, an alkylaryl group, an acyl group, an alkyl carbonate group, a thiol group (—SH), an alkylthio group (—$SR_9$), a nitro group (—$NO_2$), a cyano group (—C≡N), a isocyanate group (—N═C═O), a azide group (—$N_3$), a cyanate group (—O—C≡N), a nitroso group (—NO), a phosphine group [—$P(R_9)_2$], a phosphate group [—$OP(O)(OR_9)_2$], a phosphonate group [—$P(O)(OR_9)_2$], a sulfate group (—O—$SO_3R_9$), a sulfonate group (—$SO_3R_9$), a thiocyanate group (—S═C═N), a iso thiocyanate group (—N═C═S), a —$COR_9$ group, a —$COOR_9$ group, a —$CON(R_9)_2$ group, a —$CSR_9$ group, a —CS—$OR_9$ group, a —$N(R_9)_2$ group, a —CO—O—CO—$R_9$, a —CO—$NR_9$—CO—$R_9$, a —N═C($R_9)_2$, or a —$CR_9$═$NR_9$; where each $R_9$ is independently, a hydrogen, an alkyl, an aryl, an alkenyl or an alkynyl group, and each of which $R_9$ may be optionally substituted with one or more halogen, hydroxy group, nitro group, cyano group, isocyano group, oxo group, thioxo group, azide group, cyanate group, isocyanate group, nitroso group, phosphine group, phosphate group, thiocyano group, or thiocyanate group. Additionally $R_1$, $R_2$, $R_3$, $R_4$, $R_5$, $R_6$, $R_7$, $R_8$, $R_{10}$, $R_{12}$, $R_{13}$, and $R_{14}$, may be oligomeric, prepolymeric or polymeric in nature and selected from the group consisting of end-capped or uncapped polyethers, poly(fluoroethers), polyglycols, polyacetals, polyolefins, polystyrene, polyfluoroolefins, polyoxides, polychlorolefins, polychlorofluoroolefins, polysiloxanes, polyesters, polybromoesters, natural and synthetic rubbers, polyols, polyalcohols, polyacids, polycarbonates, polyanhydrides, polysulfides, polyamides, polyamines, polyimides, vinyl polymers, polymers derived from the polymerization of unsaturated monomers, polyacrylates, polymethacrylates, polyacrylonitriles, polybutadiene, alkyds, polyurethanes, epoxies, cellulose and its derivatives, starch and its derivatives, polypeptides, and copolymers thereof. The above copolymer structure is known by a Person Having Ordinary Skill in the Art to represent a random copolymer, and is not meant to imply a block copolymer structure herein.

The polymer of this invention contains chiral centers and therefore may exists in different streoisomers. Specifically one of the preferred polymer poly(2,5-dihydroxy-2,4-dioxane) (PDHDO) contains two chiral center market by an asterisk in the structure below:

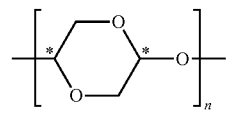

Therefore this polymer exists in various forms, including an atactic form in which the stereochemistry at the two chiral carbon atoms is random, and several tactic (stereo-regular) forms in which the stereochemistry at those carbons is constant. FIG. 1 shows various possible tactic structures. The tacticity of a polymer is important because it affects its physical mechanical properties. Atactic polymers are often soft amorphous materials while their tactic forms have a high degree of crystallinity, which translates into a higher strength and allows them to be spun into fibers. Thus, the atactic and tactic forms of the same polymer generally have different applications and the tactic form is used when higher performance is required.

α-Hydroxyl carbonyl compounds (alpha-hydroxyl carbonyl compounds) are molecules that contain a hydroxyl group on the first (α) carbon next to a carbonyl group as shown in the chemical structure below. α-Hydroxyl carbonyl compounds include α-hydroxyaldehydes and α-hydroxyketones. α-Hydroxyketones are also known as α-acyloins, a class of compounds understood by a Person Having Ordinary Skill in the Art.

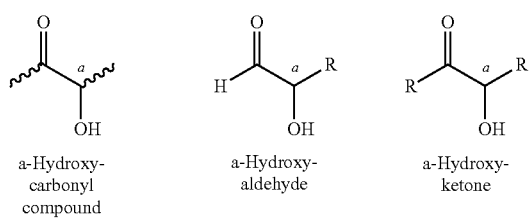

a-Hydroxy-carbonyl compound    a-Hydroxy-aldehyde    a-Hydroxy-ketone

Certain α-hydroxyaldehydes and α-hydroxyketones can be obtained from the controlled pyrolysis of cellulosic materials.

A Lewis acid is a chemical species that is an electron-pair acceptor and therefore able to react with a Lewis base to form a Lewis adduct, by sharing the electron pair furnished by the Lewis base. A Lewis base, then, is any species that donates a pair of electrons to a Lewis acid to form a Lewis adduct. Lewis acids include salts of Fe(II), Cu(II), Zn(II), Cd(II), In(III), Pb(II), Sc(III), Y(III), Ln(III)), B(III), Si(IV), P(III), P(IV), Ti(IV), V(III), Ge(IV), Zr(IV), Nb(V), Mo(V), Sn(IV), Sb(V), Hf(IV), Ta(V), W(VI), Re(V), Tl(III) Li(I), Na(I), Mg(II), Al(III), K(I), Ca(II), Cr(III), Mn(II), Co(II), Ni(II), Ga(III), Ru(III), Rh(III), Pd(II), Ag(I), Ba(II), Os(III), Ir(III), Pt(II), Au(I), Hg(II), and Bi(III).

Proffered Lewis acids includes salts of Fe(II), Cu(II), Zn(II), Cd(II), Pb(II), Sc(III), Y(III), and Ln(III). Other preferred Lewis acids of this invention are those that are stable in water. Most preferred Lewis acids are salts of Sc(III).

A functional group is a combination of atoms (or in the case of halides a single atom) that when attached to an organic radical has either a specific reactivity or imparts to the molecule a specific character, for example, by electron withdrawing or electron donating action. Hydrogen is not a functional group. Typical functional groups include halogen atoms, nitro groups, cyano groups, cyanate groups, thiocyanate groups, isocyanate groups, thioisocyanate groups, alcohol groups (e.g. organic groups with one or more OH groups), polyol groups (e.g., organic groups with more than one and more typically a plurality of OH groups), alkoxide groups, ether groups (e.g., alkyl or other organic groups containing one or more C—O—C linkages), thiols, thioether groups (e.g., alkyl or other organic groups containing one or more C—S—C linkages), silyl (e.g., R$_3$Si—, where R is various substituents or organic groups), siloxy (e.g., R$_2$—Si(OR)—), aldehyde groups (organic radicals containing a —COH moiety), ketone groups (organic radicals containing a CO moiety), carboxylic acids (organic radicals containing —COOH groups or —COO$^-$ groups, carboxylic ester groups (organic groups containing —COOR" groups, where R" is an alkyl group or other organic group), acyl halide groups (organic groups containing —COX groups where X is a halide), anhydride groups (an organic group containing an anhydride group), groups containing other carboxylic acid derivatives, amino groups, alkyl amino groups, amino oxide groups and groups containing other derivatives of amino groups, diazo groups, azide groups, phosphoric acid ester groups, alkyl phosphate groups and groups containing other phosphoric acid derivatives, phosphinic acid groups, and groups containing phosphinic acid derivatives, phosphine groups, groups containing phosphonium salts, sulfuric acid ester groups, sulfate groups, sulfonate groups, groups containing sulfinic acid derivatives, groups containing sulfonium salts, groups containing oxonium salts, groups containing carbon-carbon double bonds (e.g., alkenyl groups) and groups containing carbon-carbon triple bonds (e.g., alkynyl groups), and combinations thereof.

Functional groups include organic functional groups. Many other functional groups are known in the art. Aldehyde groups, halogen atoms, isocyanate groups and acyl halide groups are examples, among many others, of functional groups that may be used to impart a desired reactivity to a molecule or polymer. Nitro groups, cyano groups, chlorine and bromine atoms, and carboxylic acid derivatives are examples, among many others, of functional groups with electron-withdrawing properties. Alcohol groups, alkoxide groups, thiol groups, mercapto groups, and amino groups are examples, among many others, of groups with electro-donating properties. The terms "electron-withdrawing group: and "electron-donating group" are terms that are well known in the art of chemistry. Many groups are known in the art which are classified into one of these groupings. These terms are used herein to have their broadest meaning in the art. One of ordinary skill in the art understands the meaning of these terms and knows how to select functional groups which will function as an electron-withdrawing group or an electron-donating group in a particular molecular structure.

The terms alkyl or alkyl group refer to a monoradical of a straight-chain or branched saturated hydrocarbon and to cycloalkyl groups having one or more rings. An alkyl group is formally derived from removal of a hydrogen atom from an alkane. Alkyl groups may include portions that are straight-chain, branched or cyclic. Unless otherwise indicated alkyl groups have 1-20 carbon atoms (C1-C20 alkyl groups) and preferred are those that contain 1-12 carbon atoms (C1-C12 alkyl groups). In specific embodiments, alkyl groups contain 1 to 3 carbon atoms (C1-C3 alkyl groups). Specific linear and branched alkyl groups include, by way of example, methyl, ethyl, n-propyl, i-propyl, n-butyl, i-butyl, s-butyl, t-pentyl, hexyl groups, heptyl groups, octyl groups, nonyl groups and decyl groups, including all isomers thereof. The term cycloalkyl refers to cyclic alkyl groups having 3 to 20 carbon atoms (C3-C20 cycloalkyl group) having a single ring or multiple rings, including bicyclic, tricyclic, fused or spiro ring structures. Cycloalkyl groups also include those having linked cycloalkyl rings, such as those linked by a single bond or a methylene (e.g., bicyclohexane, or biscyclohexylmethylene) or those linked by an atom or group, such as —O—, —S—, —CO—, or —NR—, where R is hydrogen or a C1-C6 alkyl. Cycloalkyl groups include, by way of example, cyclopropyl, cyclobutyl, cyclopentyl, cyclohexyl, cylcoheptyl, cyclooctyl, and the like, or multiple ring structures such as adamantoyl. Unless otherwise indicated alkyl groups including cycloalkyl groups are optionally substituted with a functional group as defined herein. In specific embodiments, alkyl groups are haloalkyl groups substituted with one or more halogens, particularly F, Cl or Br, which include perhalogenated alkyl groups where all hydrogens of an alkyl group are replaced with a halogen. Haloalkyl groups include among others, trifluoromethyl, pentafluoroethyl, trichloromethyl, 2,2,2-trihaloethyl, 2,2 dihalopropyl, 4-halocyclohexyl, etc. In specific embodiments, alkyl groups are substituted with one or more hydroxy groups. Hydroxyalkyl groups include those substituted with 1-6 hydroxy groups. Hydroxyl alkyl groups include among others, hydroxymethyl, 2-hydroxyethyl, 2,3-dihydroxypropyl, 4-hydroxycyclohexyl, etc.

Arylalkyl, heterocyclylalkyl or heteroaryl are a subset of substituted alkyl groups and alkyl refer respectively to alkyl groups, substituted with an aryl, heterocyclyl or heteroaryl groups. All of which groups are as defined herein. Specific arylalkyl groups include benzyl, phenethyl (generally phenalkyl), morpholinylalkyl, pyridinylalkyl.

The terms alkenyl or alkenyl group refer to a monoradical of a straight-chain, branched or cyclic hydrocarbon group (cycloalkenyl) having one or more double bonds. An alkenyl group is formally derived from removal of a hydrogen atom from an alkene. Alkenyl groups may include straight-chain, branched and/or cyclic portions. Cycloalkenyl groups have one or more rings wherein at least one ring contains a double bond. Unless otherwise indicated alkenyl groups have 2 to 20 carbon atoms and more specifically contain 2-12 carbon atoms. Alkenyl groups may contain one or more double bonds (C=C) which may be conjugated or unconjugated. Preferred alkenyl groups are those having 1 or 2 double bonds and include omega-alkenyl groups. Alkenyl groups include those having 2 to 6 carbon atoms including ethylene (vinyl), propylene, butylene, pentylene, and hexylene groups including all isomers thereof. Cycloalkenyl groups include, by way of example, single ring structures (monocyclic) such as cyclopropenyl, cyclobutenyl, cyclopentenyl, cyclohexenyl, cyclooctenyl, cylcooctadienyl and cyclooctatrienyl as well as multiple ring structures (bicyclic, tricyclic, spiro or linked rings). Unless otherwise indicated alkenyl groups including cycloalkenyl groups are optionally substituted with a functional group as defined herein.

The terms alkynyl or alkynyl group refers to a monoradical of an unsaturated straight-chain, branched or cyclic hydrocarbon having one or more triple bonds (CC). An alkynyl group is formally derived from removal of a hydrogen atom from an alkyne. An alkynyl group may have portions that are straight-chain, branched and/or cyclic. Unless otherwise indicated alkynyl groups have 2 to 20 carbon atoms and more specifically contain 2-12 carbon atoms. Alkynyl groups include ethynyl, propargyl, and the like. In specific embodiments, alkynyl groups have 2-6 carbon atoms. Unless otherwise specified alkynyl groups are optionally substituted with a functional group as defined herein.

Aromatic ring refers to one or more conjugated ring(s) in which p orbitals of the ring atoms are delocalized or conjugated over the ring(s). Aromatic rings may contain one or more heteroatoms. In specific embodiments, heteroatoms are N, O or S. An aromatic ring may be a single ring, e.g., a 5- or 6-member ring, or two or more fused rings, e.g., two or three 6-member rings or one or two 5-member rings fused to one or two six-member rings.

An aryl group or an aromatic group is a group containing at least one aromatic ring. The group is formally derived by removing a hydrogen atom from an aromatic ring. Aryl groups include heteroaromatic groups or heteroaryl groups, which are formally derived by removing a hydrogen atom from group containing at least on aromatic ring containing at least one heteroatom. Rings of aryl or heteroaryl groups may be linked by a single bond or a linker group or may be fused. Exemplary aryl groups include phenyl, biphenyl and naphthyl groups. Aryl and heteroaryl groups include those having from 6 to 20 carbon atoms and those containing 6-12 carbon atoms. Unless otherwise noted aryl and heteroaryl groups are optionally substituted with a functional group as described herein. In specific embodiments herein aryl groups include those in which all ring atoms are carbon. In specific embodiments aryl and heteroaryl groups are those having one, two or three rings of which at least one is aromatic. In specific embodiments, aryl and heteroaryl groups have 6-12 ring atoms of which 1-6 and more specifically 1-4 are heteroatoms, particularly N, O or S.

The term "alicyclyl" generically refers to a monoradical that contains one or more rings of carbon atoms and heteroatoms, which may be a saturated ring (e.g., cyclohexyl) or unsaturated (e.g., cyclohexenyl), but which are not aromatic. More specifically alicyclic groups contain 3-20 ring atoms which can all be carbons or of which 1-8 ring atoms can be heteroatoms. In specific embodiments, heteroatoms include O, N, S, P or B. In specific embodiments, heteroatoms are O, N and S. Ring structures have three or more atoms and typically have 3-12 atoms. Rings structures may be fused or linked. Ring structures may be for example bicylic, or tricyclic. Rings may be linked with a single bond, a methylene, alkylene or other specified linking groups. Heterocyclyl is a subset of alicyclyl which refers to a monoradical that contains at least one ring of atoms, which may be a saturated, or unsaturated wherein one or more carbons of the ring are replaced with a heteroatom (a non-carbon atom) To satisfy valence any heteroatoms may be bonded to H or a substituent groups. One or more ring carbons of alicyclyl and heterocyclyl groups may optionally be replaced with —CO— or —CS— groups. Alicyclyl and hererocyclyl groups are optionally substituted as defined herein. In specific embodiments, alicyclyl and heterocyclyl groups contain 6-12 carbons, optionally contain 1-4 heteroatoms, optionally contain one or two double bonds, and/or optionally replace one or two ring carbons with —CO— or —CS— groups.

Heteroatoms include among others, O, S, N, P, B, Si, As, Bi, Ge, Sn, and Sb. In more specific embodiments, heteroatoms include O, N, S, P or B. In specific embodiments, one or more heteroatoms are substituted for carbons in aromatic or carbocyclic rings. To satisfy valence any heteroatoms in such aromatic or carbocyclic rings may be bonded to H or a substituent group.

Alkoxy refers generally to groups of structure —OR where R is an alkyl group as defined herein. In specific embodiments, alkoxy groups have 1-6 or 1-3 carbon atoms. Specific examples include methoxy-, ethoxy-, propoxy-, isopropoxy-, cyclopropyloxy-, cyclohexyloxy- and the like. Alkenoxy and alkynoxy refer similarly to groups —OR, where R is an alkenyl group or alkynyl group, respectively, as defined herein. In specific embodiments, alkenoxy and alkynoxy groups have 2-8 or 2-4 carbon atoms. Aryloxy, heteroaryloxy, heterocyclyloxy and similar terms refer to groups —OR where the R is an aryl, heteroaryl, heterocyclyl or similar group, respectively, as defined herein. Specific aryloxy groups include phenyloxy, biphenyloxy. Alkoxy groups are optionally substituted as described herein.

Alkoxyalkyl, alkoxyalkenyl, alkoxyalkynyl are subsets of substituted alkyl, alkenyl or alkynyl groups and refer respectively to alkoxy substituted alkyl, alkenyl or alkynyl groups. All of which groups are as defined herein and all of which groups are optionally substituted as defined herein.

Arylalkyl, heterocyclylalkyl or heteroaryl are a subset of substituted alkyl groups and alkyl refer respectively to alkyl groups, substituted with an aryl, heterocyclyl or heteroaryl groups. All of which groups are as defined herein. Specific arylalkyl groups include benzyl, phenethyl (generally phenalkyl), morpholinylalkyl, pyridinylalkyl. Arylalkyl, heterocyclylalkyl or heteroaryl groups are optionally substituted as defined herein.

Acyl refers generally to groups of structure —COR, where R is hydrogen (a formyl group) or an aliphatic or aromatic group, which includes alicyclic, heterocyclic, aromatic or heteroaromatic groups. In specific embodiments, acyl groups have 1-20, 1-12 or 1-6 carbon atoms and optionally 1-3 heteroatom, optionally one double bond or one triple bond. In specific embodiments, R is a C1-C6 alkyl, alkenyl or alkynyl group, a cyclic configuration or a combination thereof, attached to the parent structure through a carbonyl functionality. Examples include acetyl, benzoyl, propionyl, isobutyryl, or oxalyl. The R group of acyl groups is optionally substituted as described herein.

The term amino group refers generally to a —N(R)$_2$ group where each R independently is hydrogen, alkyl, alkenyl, alkynyl, alicyclyl, heterocyclyl, aryl or heteroaryl each of which is optionally substituted as defined herein and where named groups are as defined herein. In specific embodiments, an amino group is —NH$_2$ or an alkylamino, wherein one or both of the R groups are optionally substituted alkyl groups and the other R is hydrogen or a bisalkylamino group where both of the R groups are optionally substituted alkyl groups. In a specific embodiment, one or both of the R groups are aryl groups and the other of R is a hydrogen. More specifically R groups include optionally substituted C1-C6 alkyl groups, unsubstituted C1-C6 alkyl groups, haloalkyl groups, and hydroxyalkyl groups and aryl substituted alkyl groups. Specific aryl groups include optionally substituted phenyl groups and halogen substituted phenyl groups.

The term oxo group and thioxo group refer to substitution of a carbon atom with a =O or a =S to form respectively —CO— (carbonyl) or —CS— (thiocarbonyl) groups.

The term mercapto refers to a —SH group.

Optional substitution herein most generally includes substitution by one or more halogen, hydroxy group, nitro group, cyano group, isocyano group, oxo group, thioxo group, azide group, cyanate group, isocyanate group, nitroso group, phosphine group, phosphate group, thiocyano group, thiocyanate group, —COR$_9$ group, —COOR$_9$ group, —CON(R$_9$)$_2$ group, —CSR$_9$ group, —CS—OR$_9$ group, —N(R$_9$)$_2$ group, —CO—O—CO—R$_9$, —CO—NR$_9$—CO—R$_9$, —N=C(R$_9$)$_2$, —CR$_9$=NR$_9$, alkyl group, alkenyl group, alkynyl group, alkoxy group, alkoxyalkyl group, alkoxyalkenyl group, alkoxyalkynyl group, haloalkyl, haloalkenyl, haloalkynyl, or haloalkoxy, where each R$_6$ is independently, a hydrogen, an alkyl, alkenyl, alkynyl, or aryl group, each of which R$_6$ or substituent group is, if possible, optionally substituted with one or more halogen, hydroxy group, nitro group, cyano group, isocyano group, oxo group, thioxo group, azide group, cyanate group, isocyanate group, nitroso group, phosphine group, phosphate group, thiocyano group, thiocyanate group, unsubstituted alkyl, unsubstituted alkenyl, unsubstituted alkynyl, or unsubstituted aryl groups. In specific embodiments, alkyl groups are C1-C3 alkyl groups. In specific embodiments, alkyl groups are unsubstituted C1-C3 alkyl groups. In specific embodiments, alkyl and alkenyl groups are cycloalkyl or cycloalkenyl groups, respectively, having 3-8 carbon ring atoms and which are in turn optionally substituted. In specific embodiments, aryl groups are groups having 1 or 2 5- or 6-member rings at least one of which is aromatic and which optionally has 1-4 heteroatoms, particularly heteroatoms selected from N, O or S. In specific embodiments, aryl groups are carbocyclic groups having no heteroatoms. In specific embodiments, aryl groups are carbocyclic unsubstituted groups or are unsubstituted heteroaryl groups. In specific embodiments, optional substitution is substitution with 1-12 non-hydrogen substituents.

In specific embodiments, optional substitution is substitution with 1-6 non-hydrogen substituents. In specific embodiments, optional substitution is substitution with 1-3 non-hydrogen substituents. In specific embodiments, optional substituents contain 6 or fewer carbon atoms. In specific embodiments, optional substitution is substitution by one or more halogen, hydroxy group, cyano group, oxo group, thioxo group, unsubstituted C1-C6 alkyl group or unsubstituted aryl group.

As to any of the groups herein which contain one or more substituents, it is understood, that such groups do not contain any substitution or substitution patterns which are sterically impractical and/or synthetically non-feasible. In addition, the compounds of this invention include all stereochemical and optical isomers arising from optional substitution as defined herein.

The compounds of this invention may contain one or more chiral centers. Accordingly, this invention is intended to include racemic mixtures, diasteromers, enantiomers and mixture enriched in one or more steroisomer. The scope of the invention as described and claimed encompasses the racemic forms of the compounds as well as the individual enantiomers and non-racemic mixtures thereof.

When a group of chemical species is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. Compounds described herein may exist in one or more isomeric forms, e.g., structural or optical isomers. When a compound is described herein such that a particular isomer, enantiomer or diastereomer of the compound is not specified, for example, in a formula or in a chemical name, that description is intended to include each isomers and enantiomer (e.g., cis/trans isomers, R/S enantiomers) of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Isotopic variants, including those carrying radioisotopes, may also be useful in diagnostic assays and in therapeutics. Methods for making such isotopic variants are known in the art. Specific names of compounds are intended to be exemplary, as it is known that one of ordinary skill in the art can name the same compounds differently.

Molecules disclosed herein may contain one or more ionizable groups [groups from which a proton can be removed (e.g., —COOH) or added (e.g., amines) or which can be quaternized (e.g., amines)]. All possible ionic forms of such molecules and salts thereof are intended to be included individually in the disclosure herein. With regard to salts of the compounds herein, one of ordinary skill in the art can select from among a wide variety of available counterions those that are appropriate for preparation of salts of this invention for a given application. In specific applications, the selection of a given anion or cation for preparation of a salt may result in increased or decreased solubility of that salt.

Every formulation or combination of components described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure.

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending on the variable being defined). For example, "at most 4" means 4 or less than 4, and "at most 40%" means 40% or less than 40%. When, in this specification, a range is given as "(a first number) to (a second number)" or "(a first number)-(a second number)", this means a range whose lower limit is the first number and whose upper limit is the second number. For example 25 to 100 mm means a range whose lower limit is 25 mm, and whose upper limit is 100 mm.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. The broad term comprising is intended to encompass the narrower consisting essentially of and the even narrower consisting of. Thus, in any recitation herein of a phrase "comprising one or more claim element" (e.g., "comprising A and B"), the phrase is intended to encompass the narrower, for example, "consisting essentially of A and B" and "consisting of A and B." Thus, the broader word "comprising" is intended to provide specific support in each use herein for either "consisting essentially of" or "consisting of." The invention illustratively described herein suitably may be practiced in the absence of any element or elements, limitation or limitations which is not specifically disclosed herein.

One of ordinary skill in the art will appreciate that starting materials, catalysts, reagents, synthetic methods, purification methods, analytical methods, assay methods, and polymers other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by examples, preferred embodiments and optional features, modification and variation of the concepts herein disclosed may be resorted to by those skilled in the art, and that such modifications and variations are considered to be within the scope of this invention as defined by the appended claims.

All references cited herein are hereby incorporated by reference to the extent that there is no inconsistency with the disclosure of this specification.

The non-limiting examples below illustrate certain embodiments of the invention.

All reactions were run under argon in the glovebox ($O_2 < 5$ ppm) in anhydrous solvents that were stored over molecular sieves prior to use.

Example 1

Polymerization of 2,5-dihydroxy-1,4-dioxane (DHDO) with a stoichiometric amount of trimethylsilyl trifluoromethanesulfonate (TMSOTf)

DHDO (5 mmol) was added to a rigorously dried round bottom flask and then cooled in a bath of ice and brine (−15° C.). Acetonitrile (5 mL, anhydrous) was added next via syringe. To this cold suspension of the glycolaldehyde dimer was added dropwise neat trimethylsilyl trifluoromethanesulfonate (TMSOTf, 10.5 mmol, 2.25 equiv) over a period of around 5 minutes. After the addition of the TMSOTf was complete, the solution was homogenous and began to turn yellow. The solution was stirred overnight and allowed to warm to room temperature. The solution was evaporated en vacuo to provide a brown viscous material. Proton NMR (400 MHz, DMSO-d6) indicated complete conversion of the dimer and the presence of a dioxane ring system with resonances at 5.84, 4.83, and 4.57 ppm. A small fraction of the product separated upon standing to give a semi-crystalline solid which was characterized for its physical-mechanical properties. The average molecular weight of the product was measured by Gel Permeation Chromatography (GPC) in dimethylacetamide. The material had a multimodal distribution with two predominant fractions, an oligomer fraction having molecular weight centered at 2,000 Dalton and a higher molecular weight fraction centered at 25,000 Dalton (which corresponds to about 245 monomer repeat unit). The product also contained a small amount of chains of very high molecular weights (0.5M Dalton). The Number Average Molecular Weights (Mn) was 2081 (which corresponds to about 20.4 monomer repeat unit) and the Weight Average Molecular Weights (Mw) was 39,000. Mn is the average molecular weight divided by the number of chains, while Mw is the average molecular weight divided by the mass. The polymer was analyzed by Dynamic Mechanical Analysis (DMA) DMA was run by placing a specimen of the solid fraction in a cup sample holder and applying dynamic compression force at 1 Hz with a piston. the product had a Glass Transition at −9° C.

Example 2

End-Capping of the Product of Example 1

The product of Example 1 was dissolved in acetonitrile and treated with 0.50 mL (5.3 mmol) of acetic anhydride added dropwise at ambient temperature. After stirring the reaction for 4 hours, it was evaporated to dryness under vacuum. The crude product was dissolved in $CH_2Cl_2$, washed with a 5% solution of aqueous sodium bicarbonate then with water, dried over $MgSO_4$, and evaporated under reduced pressure to produce a solid.

The average molecular weight of both the capped polymer was measured by Gel Permeation Chromatography (GPC) in dimethylacetamide. The material had a multimodal distribution with a low molecular weight fraction centered at 2,300 Dalton and a higher molecular weight fraction centered at 73,000 Dalton ((which corresponds to about 715 monomer repeat unit) for the capped material. The Number Average Molecular Weights (Mn) was 2312 Dalton and the Weight Average Molecular Weights (Mw) was 206,000.

Example 3

Polymerization of 2,5-dihydroxy-1,4-dioxane (DHDO) with molecular sieves and a catalytic amount of scandium triflate $(Sc(OTf)_{(3)}$ in acetonitrile under reduced pressure Sieves were found to disintegrate while stirring in solution, therefore reactions were run where the sieves were placed in a Soxhlet cup and the solvent was refluxed under reduced pressure through the sieves and back into the reaction solution. 1.0 g (8.3 mmol) of DHDO and 0.2 g (0.41 mmol, 5%) of $Sc(OTf)_3$ (scandium triflate) were dissolved in 50 mL anhydrous acetonitrile (MeCN) in a 100 mL round bottom flask. A Soxhlet extraction cup was filled with 4 g of 3 Å molecular sieves and the cup was placed in the Soxhlet extractor along with an additional 20 mL of anhydrous MeCN. The reaction was set up to reflux the acetonitrile through the molecular sieves under reduced pressure; the MeCN was refluxed at 150 Torr (bp ~35° C.) overnight. Once the reaction cooled to ambient temperature, the Soxhlet extractor was removed and the colorless reaction solution was evaporated to dryness under vacuum. The crude product was dissolved in $CH_2Cl_2$, washed with water, dried over $MgSO_4$, and isolated to produce a fluffy, white solid. $^1H$ NMR (DMSO-$d_6$) showed no monomer, polymer peaks, and a small aldehyde peak.

GPC analysis was carried out using a Waters GPC with a UV detector and a mixed bed column. 16 mg of polymer were dissolved in 4 mL of dimethylacetamide and analyses were carried out in triplicate. Molecular weight was determined against a polystyrene calibration curve. The Number Average Molecular Weights (Mn) was 1617 Dalton ((which corresponds to about 15.8 monomer repeat unit) and the Weight Average Molecular Weights (Mw) was 2836. The polydispersity index (PDI) was 1.75.

The product from this reaction was dissolved in chloroform and cast into thin films from a chloroform solution on either float glass or teflon. Evaporation of the solvent was first slowed down by covering the film with a dish and then accelerated to obtain defect-free specimen. Release of the film from the substrate was aided by cooling the film in a freezer.

Melting point was measured with a melting point apparatus; PDHDO turned transparent at 70° C. and then flowed at about 115° C.

A specimen of PDHDO (0.133"×0.018"×0.25") was mounted in a Instron Mechanical Tester with a 20 lb frame and pulled in tension at a rate of 0.1 "/min. The specimen elongated to 800% before failing and had a Young's Modulus of 40 KPa.

Differential Scanning calorimetry (DSC) was measured with a Perkin Elmer DSC-7 on a piece of film 2.7 mg in weight. The specimen was first cooled to liquid nitrogen temperature, then heated at 10° C./min to 100° C. and held there for 2 min, then cooled back to liquid nitrogen temperature and held there for 2 minutes, and finally heated at 10° C./min to 160° C. The first heating scan shows a glass transition with onset at –3° C. and a melting peak at 78-82° C. The second heating scan shows a glass transition at 23° C.

Example 4

Synthesis of PDHDO Using $(Sc(OTf)_3$ then TMSOTf 1.0 g (8.3 mmol) of DHDO and 0.2 g (0.41 mmol, 5%) of $Sc(OTf)_3$ (scandium triflate) were dissolved in 50 mL anhydrous acetonitrile (MeCN) in a 100 mL round bottom flask. A Soxhlet extraction cup was filled with 4 g of 3 Å molecular sieves and the cup was placed in the Soxhlet extractor along with an additional 20 mL of anhydrous MeCN. The reaction was set up to reflux the acetonitrile through the molecular sieves under reduced pressure; the MeCN was refluxed at 150 Torr (bp ~35° C.) overnight. Once the reaction cooled to ambient temperature, the Soxhlet extractor was removed and the colorless reaction solution was treated with 0.10 mL (0.55 mmol, 7%) of trimethylsilyltrifluoromethanesulfonate (TMSOTf) added dropwise at ambient temperature. After stirring the reaction for 24 hours, it was evaporated to dryness under vacuum. The crude product was dissolved in $CH_2Cl_2$, washed with water, dried over $MgSO_4$, and isolated to produce a fluffy, white solid.

Example 5

Synthesis of PDHDO in an Ionic Liquid (BMIM)OTf 0.60 g (5.0 mmol) of DHDO and 0.12 g (0.25 mmol, 5%) of $Sc(OTf)_3$ were dissolved in 5 mL of 3-butyl-1-methylimidazolium trifluoromethanesulfonate, BMIM(OTf), ionic liquid. The reaction was stirred under dynamic vacuum while heating to 50° C. overnight. This caused some precipitate to form in the reaction. The solid was isolated by adding ~20 mL of ethyl acetate and filtering. The solid was washed with ethyl acetate and dried under vacuum to produce a cream-colored solid.

Example 6

Synthesis of PDHDO in an Ionic Liquid (HMIM)(NTf$_2$)

0.60 g (5.0 mmol) of DHDO and 0.22 g (0.25 mmol, 5%) of $Sc(NTf_2)_3$ were suspended in 5 mL of 3-hexyl-1-methylimidazolium trifluoromethanesulfonimide, HMIM(NTf$_2$), ionic liquid. The reaction was stirred under dynamic vacuum while heating to 50° C. overnight. Upon heating the reagents dissolved and then slowly a precipitate formed in the reaction. The solid was isolated by adding ~20 mL of ethyl acetate and filtering. The solid was washed with ethyl acetate and dried under vacuum to produce a cream-colored solid.

Example 7

Synthesis of End-Capped PDHDO 1.0 g (8.3 mmol) of DHDO (2,5-dihydroxy-1,4-dioxane) and 0.20 g (0.41 mmol, 5%) of scandium(III) triflate were dissolved in 50 mL anhydrous acetonitrile in a 100 mL round bottom flask. A Soxhlet extraction cup was filled with 4 g of 3 Å molecular sieves and the cup was placed in the Soxhlet extractor along with an additional 20 mL of anhydrous MeCN. The reaction was set up to reflux the acetonitrile through the molecular sieves under reduced pressure; the MeCN was refluxed at 150 Torr (bp ~35° C.) overnight. Once the reaction cooled to ambient temperature, the Soxhlet extractor was removed and the colorless reaction solution was treated with 0.50 mL (5.3 mmol) of acetic anhydride added dropwise at ambient temperature. After stirring the reaction for 4 hours, it was evaporated to dryness under vacuum. The crude product was dissolved in $CH_2Cl_2$, washed with a 5% solution of aqueous sodium bicarbonate then with water, dried over MgSO$_4$, and evaporated under reduced pressure to produce a fluffy, white solid.

Example 8

Synthesis of Poly(Lactaldehyde)

1.0 g (6.7 mmol) of lactaldehyde dimer (also called 2-hydroxypropanal) and 0.16 g (0.32 mmol, 5%) of scandium(III) triflate were dissolved in 50 mL anhydrous acetonitrile in a 100 mL round bottom flask. A Soxhlet extraction cup was filled with 4 g of 3 Å molecular sieves and the cup was placed in the Soxhlet extractor along with an additional 20 mL of anhydrous MeCN. The reaction was set up to reflux the acetonitrile through the molecular sieves under reduced pressure; the MeCN was refluxed at 150 Torr (bp ~35° C.) overnight. Once the reaction cooled to ambient temperature, the reaction solution was evaporated to dryness under vacuum. The crude product was dissolved in CH$_2$Cl$_2$, washed with water, dried over MgSO$_4$, and evaporated under reduced pressure to produce a solid.

Example 9

Synthesis of Poly(Mandelaldehyde)

2.05 g (6.7 mmol) of mandelaldehyde dimer (also called 2-hydroxy-2-phenylacetaldehyde) and 0.16 g (0.32 mmol, 5%) of scandium(III) triflate were dissolved in 50 mL anhydrous acetonitrile in a 100 mL round bottom flask. A Soxhlet extraction cup was filled with 4 g of 3 Å molecular sieves and the cup was placed in the Soxhlet extractor along with an additional 20 mL of anhydrous MeCN. The reaction was set up to reflux the acetonitrile through the molecular sieves under reduced pressure; the MeCN was refluxed at 150 Torr (bp ~35° C.) overnight. Once the reaction cooled to ambient temperature, the reaction solution was evaporated to dryness under vacuum. The crude product was dissolved in CH$_2$Cl$_2$, washed with water, dried over MgSO$_4$, and evaporated under reduced pressure to produce a solid.

Example 10

Synthesis of PDHDO by Direct Dehydration of DHDO

DHDO was added to a mixture of toluene and DMSO and reacted in a Dean-Stark apparatus to remove the water. The 1H-NMR spectrum of the product showed the desired product and small amounts of unreacted starting material and impurities.

Example 11

Polymerization of DHDO with Scandium Trifluoromethanesulfonimide, Sc(NTf$_2$)$_3$ DHDO and 0.1 equiv Sc(NTf$_2$)$_3$ were stirred in MeCN overnight. The colorless solution was reduced to dryness to produce a colorless tacky solid.

Example 12

Polymerization of DHDO with Metal Triflate

The reaction of Example 3 was repeated by replacing Sc(OTf)$_3$ with an equivalent amount of La(OTf)$_3$, Yb(OTf)$_3$, or Zn(OTf)$_2$. Reactions were stirred overnight in the absence of air and then isolated as in example 3. 1 H-NMR spectroscopy indicated that the products of these reactions had either lower yields or lower purity than the product of the reaction with scandium triflate.

Example 13

Copolymerization of Lactaldehyde Dimer and DHDO 1.0 g (8.3 mmol) of DHDO (2,5-dihydroxy-1,4-dioxane), 1.0 g (6.7 mmol) of lactaldehyde dimer (also called 2-hydroxypropanal) and 0.36 g (0.73 mmol, 5%) of scandium(III) triflate were dissolved in 100 mL anhydrous acetonitrile in a 250 mL round bottom flask. A Soxhlet extraction cup was filled with 8 g of 3 Å molecular sieves and the cup was placed in the Soxhlet extractor along with an additional 40 mL of anhydrous MeCN. The reaction was set up to reflux the acetonitrile through the molecular sieves under reduced pressure; the MeCN was refluxed at 150 Torr (bp ~35° C.) overnight. Once the reaction cooled to ambient temperature, the reaction solution was evaporated to dryness under vacuum. The crude product was dissolved in CH$_2$Cl$_2$, washed with water, dried over MgSO$_4$, and evaporated under reduced pressure to produce a white solid.

Example 14

Synthesis of PDHDO in Butyronitrile 1.0 g (8.3 mmol) of DHDO (2,5-dihydroxy-1,4-dioxane) and 0.20 g (0.41 mmol, 5%) of scandium(III) triflate were dissolved in 50 mL anhydrous butyronitrile in a 100 mL round bottom flask. A Soxhlet extraction cup was filled with 4 g of 3 Å molecular sieves and the cup was placed in the Soxhlet extractor along with an additional 20 mL of anhydrous butyronitrile. The reaction was set up to reflux the solvent through the molecular sieves under reduced pressure; the PrCN was refluxed at 100 Torr (bp ~35° C.) overnight. Once the reaction cooled to ambient temperature, the reaction solution was evaporated to dryness under vacuum. The crude product was dissolved in CH$_2$Cl$_2$, washed with water, dried over MgSO$_4$, and evaporated under reduced pressure to produce a fluffy, white solid.

Example 15

Synthesis of PDHDO in Isovaleronitrile.

1.0 g (8.3 mmol) of DHDO (2,5-dihydroxy-1,4-dioxane) and 0.20 g (0.41 mmol, 5%) of scandium(III) triflate were dissolved in 50 mL anhydrous isovaleronitrile in a 100 mL round bottom flask. A Soxhlet extraction cup was filled with 4 g of 3 Å molecular sieves and the cup was placed in the Soxhlet extractor along with an additional 20 mL of anhydrous isovaleronitrile. The reaction was set up to reflux the solvent through the molecular sieves under reduced pressure; the reaction was refluxed at 50 Torr overnight. Once the reaction cooled to ambient temperature, the reaction solution was evaporated to dryness under vacuum. The crude product was dissolved in CH$_2$Cl$_2$, washed with water, dried over MgSO$_4$, and evaporated under reduced pressure to produce a fluffy, white solid.

Example 16

Polymerization of 2,3,5,6-Tetramethyl-1,4-Dioxane-2,5-diol.

1.2 g (6.8 mmol) of 2,3,5,6-tetramethyl-1,4-dioxane-2,5-diol and 0.16 g (0.33 mmol 5%) of scandium(III) triflate were dissolved in 50 mL anhydrous acetonitrile in a 100 mL round bottom flask. A Soxhlet extraction cup was filled with 4 g of 3 Å molecular sieves and the cup was placed in the Soxhlet extractor along with an additional 20 mL of anhydrous acetonitrile. The reaction was set up to reflux the acetonitrile through the molecular sieves under reduced pressure; the MeCN was refluxed at 150 Torr (bp ~35° C.) overnight. Once the reaction cooled to ambient temperature, the reaction solution was evaporated to dryness under vacuum. The crude product was dissolved in $CH_2Cl_2$, washed with water, dried over $MgSO_4$, and evaporated under reduced pressure to produce a solid.

What is claimed is:

1. A polymer comprising the chemical formula:

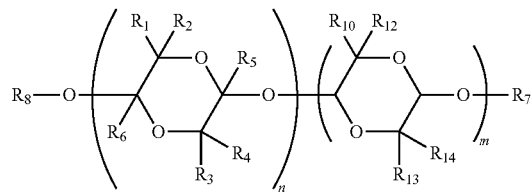

wherein: "n" is an integer number from 4 to 10,000,000, and "m" is an integer number from zero to 10,000,000; and $R_1$, $R_2$, $R_3$, $R_4$, $R_5$, $R_6$, $R_7$, $R_8$, $R_{10}$, $R_{12}$, $R_{13}$, and $R_{14}$, are independently from each other selected from the group consisting of hydrogen (—H), deuterium (-D), a halogen atom (—F, —Cl, —Br, —I), a hydroxyl group (—OH), an amino group (—$NH_2$), an alkylamino group (—$NHR_9$), a (bisalkylamino) group [—$N(R_9)_2$], an alkyl group, an alkenyl group, an alkynyl group, an alkoxy group, an alkoxyalkyl group, an alkoxyalkenyl group, an alkoxyalkynyl group, an haloalkyl group, an haloalkenyl group, an haloalkynyl group, an haloalkoxy group, an aryl group, an alkoxyaryl group, an haloaryl group, an alkylaryl group, an acyl group, an alkyl carbonate group, a thiol group (—SH), alkylthio (—$SR_9$), a nitro group (—$NO_2$), a cyano group (—C≡N), a isocyanate group (—N=C=O), a azide group (—$N_3$), a cyanate group (—O—C≡N), a nitroso group (—NO), a phosphine group [—$P(R_9)_2$], a phosphate group [—OP(O)($OR_9)_2$], a phosphonate group [—P(O)($OR_9)_2$], a sulfate group (—O—$SO_3R_9$), a sulfonate group (—$SO_3R_9$), a thiocyanate group (—S—C≡N), a iso thiocyanate group (—N=C=S), a —$COR_9$ group, a —$COOR_9$ group, a —$CON(R_9)_2$ group, a —$CSR_9$ group, a —CS—$OR_9$ group, a —$N(R_9)_2$ group, —CO—O—CO—$R_9$, a —CO—$NR_9$—CO—$R_9$, a —N=C($R_9)_2$, and a —$CR_9$=$NR_9$; and wherein, each $R_9$ is independently from each other selected from the group consisting of a hydrogen, an alkyl, an aryl, an alkenyl and an alkynyl group; and $R_9$ may be optionally substituted with one or more of the group consisting of halogen, hydroxy group, nitro group, cyano group, isocyano group, oxo group, thioxo group, azide group, cyanate group, isocyanate group, nitroso group, phosphine group, phosphate group, thiocyano group, and thiocyanate group.

2. The polymer of claim 1, wherein one or more of $R_1$, $R_2$, $R_3$, $R_4$, $R_5$, $R_6$, $R_7$, $R_8$, $R_{10}$, $R_{12}$, $R_{13}$, and $R_{14}$ is an oligomer, a pre-polymer or a polymer, the oligomer, the pre-polymer or the polymer is selected from the group consisting of end-capped polyethers, uncapped polyethers, poly(fluoroethers), polyglycols, polyacetals, polyolefins, polystyrene, polyfluoroolefins, polyoxides, polychloroolefins, polychlorofluoroolefins, polysiloxanes, polyesters, polybromoesters, natural and synthetic rubbers, polyols, polyalcohols, polyacids, polycarbonates, polyanhydrides, polysulfides, polyamides, polyamines, polyimides, vinyl polymers, polymers derived from the polymerization of unsaturated monomers, polyacrylates, polymethacrylates, polyacrylonitriles, polybutadiene, alkyds, polyurethanes, epoxies, cellulose and its derivatives, starch, starch derivatives, and polypeptides, or copolymers thereof.

3. The polymer of claim 1, wherein one or more of the $R_1$, $R_2$, $R_3$, $R_4$, $R_5$, $R_6$, $R_7$, $R_8$, $R_{10}$, $R_{12}$, $R_{13}$, and $R_{14}$ is substituted by one or more species in the group consisting of a deuterium (-D), a halogen atom (—F, —Cl, —Br, —I), a hydroxyl group (—OH), an amino group (—$NH_2$), an alkylamino group (—$NHR_9$), a (bisalkylamino) group [—$N(R_9)_2$], an alkyl group, an alkenyl group, an alkynyl group, an alkoxy group, an alkoxyalkyl group, an alkoxyalkenyl group, an alkoxyalkynyl group, an haloalkyl group, an haloalkenyl group, an haloalkynyl group, an haloalkoxy group, an aryl group, an alkoxyaryl group, an haloaryl group, an alkylaryl group, an acyl group, an alkyl carbonate group, a thiol group (—SH), an alkylthio (—$SR_9$), a nitro group (—$NO_2$), a cyano group (—C≡N), a isocyanate group (—N=C=O), a azide group (—$N_3$), a cyanate group (—O—C≡N), a nitroso group (—NO), a phosphine group [—$P(R_9)_2$], a phosphate group [—OP(O)($OR_9)_2$], a phosphonate group [—P(O)($OR_9)_2$], a sulfate group (—O—$SO_3R_9$), a sulfonate group (—$SO_3R_9$), a thiocyanate group (—S—C≡N), a iso thiocyanate group (—N=C=S), a —$COR_9$ group, a —$COOR_9$ group, a —$CON(R_9)_2$ group, a —$CSR_9$ group, a —CS—$OR_9$ group, a —$N(R_9)_2$ group, —CO—O—CO—$R_9$, —CO—$NR_9$—CO—$R_9$, —N=C($R_9)_2$, and —$CR_9$=$NR_9$.

4. The polymer of claim 1, wherein $R_1$, $R_2$, $R_3$, $R_4$, $R_5$, $R_6$, $R_{10}$, $R_{12}$, $R_{13}$, and $R_{14}$ are hydrogen; and $R_7$, and $R_8$ are selected from the group consisting of hydrogen, a linear or branched $C_1$-$C_{20}$ alkyl group, and a $C_1$-$C_{20}$ acyl group.

5. The polymer of claim 1, wherein $R_1$, $R_3$, $R_{10}$, and $R_{13}$ are the same group and are selected from a linear or branched $C_1$-$C_{20}$ alkyl group; $R_2$, $R_4$, $R_5$, $R_6$, $R_{12}$, and $R_{14}$ are hydrogen; and $R_7$, and $R_8$ are independently selected from hydrogen, a linear or branched $C_1$-$C_{20}$ alkyl group, or a $C_1$-$C_{20}$ acyl group.

6. The polymer of claim 1, wherein $R_1$, $R_3$, $R_{10}$, and $R_{13}$ are the same group and are selected from a $C_4$-$C_{20}$ aryl or alkylaryl group; $R_2$, $R_4$, $R_5$, $R_6$, $R_{12}$, and $R_{14}$ are hydrogen; and $R_7$, and $R_8$ are independently selected from the group consisting of hydrogen, a linear or branched $C_1$-$C_{20}$ alkyl group, and a $C_1$-$C_{20}$ acyl group.

7. The polymer of claim 1 wherein "n" is at least 15.

8. The polymer of claim 1 wherein "n" is at least 245.

9. A method of polymerization, the method comprising the step of reacting trimethylsilyl trifluoromethanesulfonate with a compound that comprises the structure:

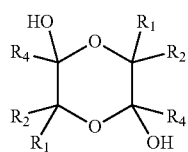

wherein, the $R_1$, $R_2$, and $R_4$, are independently from each other selected from the group consisting of hydrogen (—H), deuterium (-D), an halogen atom (—F, —Cl, —Br, —I), a hydroxyl group (—OH), an amino group (—$NH_2$), an alkylamino group (—$NHR_9$), a (bisalkylamino) group [—$N(R_9)_2$], an alkyl group, an alkenyl group, an alkynyl group, an alkoxy group, an alkoxyalkyl group, an alkoxyalkenyl group, an alkoxyalkynyl group, an haloalkyl group, an haloalkenyl group, an haloalkynyl group, an haloalkoxy group, an aryl group, an alkoxyaryl group, an haloaryl group, an alkylaryl group, an acyl group, an alkyl carbonate group, a thiol group (—SH), alkylthio (—$SR_9$), a nitro group (—$NO_2$), a cyano group (—C≡N), a isocyanate group (—N═C═O), a azide group (—$N_3$), a cyanate group (—O—C≡N), a nitroso group (—NO), a phosphine group [—$P(R_9)_2$], a phosphate group [—$OP(O)(OR_9)_2$], a phosphonate group [—$P(O)(OR_9)_2$], a sulfate group (—O—$SO_3R_9$), a sulfonate group (—$SO_3R_9$), a thiocyanate group (—S—C≡N), a iso thiocyanate group (—N═C═S), —$COR_9$ group, —$COOR_9$ group, —$CON(R_9)_2$ group, —$CSR_9$ group, —CS—$OR_9$ group, —$N(R_9)_2$ group, —CO—O—CO—$R_9$, —CO—$NR_9$—CO—$R_9$, —N═$C(R_9)_2$, and —$CR_9$═$NR_9$;

wherein each $R_9$ is independently selected from the group consisting of a hydrogen, an alkyl, an aryl, an alkenyl and an alkynyl group; and each $R_9$ may be optionally substituted with one or more of the groupo consisting of halogen, hydroxy group, nitro group, cyano group, isocyano group, oxo group, thioxo group, azide group, cyanate group, isocyanate group, nitroso group, phosphine group, phosphate group, thiocyano group, and thiocyanate group.

10. The product of the method of claim 9.

11. The product of claim 10 that contains at least 20 monomer repeat units as determined by gel permeation chromatography.

12. The product of claim 11 wherein $R_2$ and $R_4$ are hydrogen, $R_1$ is selected from the group consisting of hydrogen, branched $C_1$-$C_{20}$ alkyl group, $C_4$-$C_{20}$ aryl and alkylaryl group.

13. A method of polymerization, the method comprising the step of dehydrating a monomer that comprises the chemical structure:

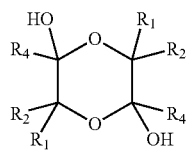

the method comprising the step of using a Lewis acid catalyst to promote the dehydration of the monomer;

wherein, the $R_1$, $R_2$, and $R_4$, are independently from each other selected from the group consisting of hydrogen (—H), deuterium (-D), a halogen atom (—F, —Cl, —Br, —I), a hydroxyl group (—OH), an amino group (—$NH_2$), an alkylamino group (—$NHR_9$), a (bisalkylamino) group [—$N(R_9)_2$], an alkyl group, an alkenyl group, an alkynyl group, an alkoxy group, an alkoxyalkyl group, an alkoxyalkenyl group, an alkoxyalkynyl group, an haloalkyl group, an haloalkenyl group, an haloalkynyl group, an haloalkoxy group, an aryl group, an alkoxyaryl group, an haloaryl group, an alkylaryl group, an acyl group, an alkyl carbonate group, a thiol group (—SH), alkylthio (—$SR_9$), a nitro group (—$NO_2$), a cyano group (—C≡N), a isocyanate group (—N═C═O), a azide group (—$N_3$), a cyanate group (—O═C═N), a nitroso group (—NO), a phosphine group [—$P(R_9)_2$], a phosphate group [—$OP(O)(OR_9)_2$], a phosphonate group [—$P(O)(OR_9)_2$], a sulfate group (—O—$SO_3R_9$), a sulfonate group (—$SO_3R_9$), a thiocyanate group (—S═C═N), a iso thiocyanate group (—N═C═S), —$COR_9$ group, —$COOR_9$ group, —$CON(R_9)_2$ group, —$CSR_9$ group, —CS—$OR_9$ group, —$N(R_9)_2$ group, —CO—O—CO—$R_9$, —CO—$NR_9$—CO—$R_9$, —N═$C(R_9)_2$, and —$CR_9$═$NR_9$;

wherein, each $R_9$ is independently from each other selected from the group consisting of a hydrogen, an alkyl, an aryl, an alkenyl and an alkynyl group;

wherein, each $R_9$ may be optionally substituted with one or more of the group consisting of halogen, hydroxy group, nitro group, cyano group, isocyano group, oxo group, thioxo group, azide group, cyanate group, isocyanate group, nitroso group, phosphine group, phosphate group, thiocyano group, and thiocyanate group;

wherein the Lewis acid is a salt of an element selected from the group consisting of Fe(II), Cu(II), Zn(II), Cd(II), In(III), Pb(II), Sc(III), Y(III), Ln(III)), B(III), Si(IV), P(III), P(IV), Ti(IV), V(III), Ge(IV), Zr(IV), Nb(V), Mo(V), Sn(IV), Sb(V), Hf(IV), Ta(V), W(VI), Re(V), Tl(III) Li(I), Na(I), Mg(II), Al(III), K(I), Ca(II), Cr(III), Mn(II), Co(II), Ni(II), Ga(III), Ru(III), Rh(III), Pd(II), Ag(I), Ba(II), Os(III), Ir(III), Pt(II), Au(I), Hg(II), and Bi(III); and wherein the Lewis acid catalyst is used in an amount ranging from 0.001 to 0.2 equivalents by mole with respect to the monomer.

14. The method of claim 13 where the Lewis acid is selected from the group consisting of salts of Sc(III), La(III), Yb(III), and Zn(II).

15. The method of claim 14 where the Lewis acid is selected from the group consisting of $Sc(OTf)_3$, $La(OTf)_3$, $Yb(OTf)_3$, $Zn(OTf)_2$ and $Sc(NTf_2)_3$.

16. The product of the method of claim 13.

17. The product of claim 16 that contains at least 15 monomer repeat units as determined by gel permeation chromatography.

18. The product of claim 12 wherein $R_2$ and $R_4$ are hydrogen, $R_1$ is selected from the group consisting of hydrogen, branched $C_1$-$C_{20}$ alkyl group, $C_4$-$C_{20}$ aryl and alkylaryl group.

19. The method of claim 13 that further comprises the step of reacting the product of the polymerization with an end-capping reagent.

20. The polymer of claim 1, further comprising the chemical formula:
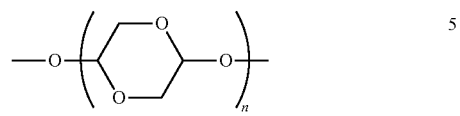
wherein, "n" is an integer from 4 to 10,000,000.
* * * * *